United States Patent
Cofler et al.

(10) Patent No.: US 7,111,152 B1
(45) Date of Patent: Sep. 19, 2006

(54) COMPUTER SYSTEM THAT OPERATES IN VLIW AND SUPERSCALAR MODES AND HAS SELECTABLE DEPENDENCY CONTROL

(75) Inventors: Andrew Cofler, Voreppe (FR); Bruno Fel, Voreppe (FR); Laurent Ducousso, Sain Nazaire les Eymes (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/563,704

(22) Filed: May 2, 2000

(30) Foreign Application Priority Data

May 3, 1999  (EP) .................................. 99410059

(51) Int. Cl.
*G06F 9/30* (2006.01)

(52) U.S. Cl. ........................... 712/216; 712/23; 712/24

(58) Field of Classification Search ................ 712/215, 712/216, 218, 219, 23, 24
See application file for complete search history.

(56) References Cited

U.S. PATENT DOCUMENTS

| | | | |
|---|---|---|---|
| 5,537,561 A | 7/1996 | Nakajima ................ 395/375 |
| 5,598,546 A * | 1/1997 | Blomgren ................. 712/209 |
| 5,699,537 A * | 12/1997 | Sharangpani et al. ...... 712/217 |
| 5,751,984 A | 5/1998 | Chang et al. .............. 395/392 |
| 5,826,089 A * | 10/1998 | Ireton ...................... 717/146 |
| 5,941,983 A * | 8/1999 | Gupta et al. ............... 712/214 |
| 5,958,042 A * | 9/1999 | Tremblay ................. 712/215 |
| 5,974,537 A * | 10/1999 | Mehra ...................... 712/215 |
| 6,480,872 B1 * | 11/2002 | Choquette ................. 708/501 |

FOREIGN PATENT DOCUMENTS

| | | |
|---|---|---|
| EP | 0 399 762 | 11/1990 |
| EP | 0 551 090 | 7/1993 |

OTHER PUBLICATIONS

Hennessy and Patterson, Computer Architecture—A Quantitative Approach, 2nd Edition, 1996, p. 189.*
Hennessy and Patterson, "Computer Architecture—A Quantitative Approach, $2^{nd}$ Edition," 1996, pp. 146-154.*
Hennessy and Patterson, "Computer Architecture—A Quantitative Approach, $2^{nd}$ Edition," 1996, pp. 278-281.*
European Search Report from European Application No. 99410059.

* cited by examiner

*Primary Examiner*—Eddie Chan
*Assistant Examiner*—David J. Huisman
(74) *Attorney, Agent, or Firm*—Lisa K. Jorgenson; James H. Morris; Wolf, Greenfield & Sacks, P.C.

(57) ABSTRACT

Instructions in a computer system are executed in a plurality of parallel execution pipelines, a horizontal dependency check is carried out between instructions supplied to the parallel pipelines and in response to detecting horizontal dependency a control signal of a first or second type is generated depending on whether the dependency can be resolved by activating a by-pass or whether a temporary stall is required in one of the pipelines.

13 Claims, 4 Drawing Sheets

COMPUTER SYSTEM THAT OPERATES IN VLIW AND SUPERSCALAR MODES AND HAS SELECTABLE DEPENDENCY CONTROL

The invention relates to apparatus and methods of handling data dependency of instructions in a computer system and more particularly to a computer system arranged to execute instructions in a plurality of parallel pipelined operations.

BACKGROUND OF THE INVENTION

Existing machines are known to operate in superscalar mode in which two or more instructions are fetched from a program memory in the same machine cycle and then executed by different execution units. Commonly such instructions are located in adjacent memory positions and fetched from memory by a single fetch operation. Machines are also known to operate in very long instruction word (VLIW) mode. Such words may include a larger number of instructions retrieved from memory as a single word at a single word address. Instructions which may be included together in a single VLIW instruction are carefully controlled by software techniques to ensure that they avoid compatibility problems or data dependency problems between the instructions forming the word.

In computer systems a plurality of instructions may be executed in parallel and in pipelined operations. Data dependency may arise between two or more instructions which are executed in parallel or in a pipelined operation.

It is an object of the present invention to provide an improved computer system for detecting and resolving data dependence between instructions for parallel execution. Embodiments of the invention may provide a very high rate of instruction execution while avoiding a complex programming model for the software tool chain and assembly programmer.

In real-time operation the instruction scheduling should be deterministic, i.e., that the hardware does not do too much "intelligent" rescheduling of instructions which are uncontrollable (and non-deterministic) because this makes the programmer/software toolchain's task extremely difficult when the real-time nature of the application has to be respected.

SUMMARY OF THE INVENTION

The invention provides a method of executing instructions in a computer system which method comprises supplying simultaneously a group of instructions each machine cycle for execution in parallel pipelines, decoding each instruction in the group, checking the instructions in the group to determine if any horizontal data dependencies exist between any pair of instructions in the group during execution in a respective pair of parallel pipelines, and in response to determination of such a data dependency selecting a dependency control signal of either a first or second type depending on whether the data dependency can be resolved by activating a bypass within one of the pipelines or whether a temporary stall is required in one of the pipelines, said method further including supplying instructions to the pair of parallel pipelines together with the selected dependency control signal of the first or second type.

The method includes supplying instructions to parallel pipelines with a dependency control signal of said first or second type and executing the instructions in the pipelines including effecting a stall or a bypass depending on whether the signal is of the first or second type.

The method may further include selecting an instruction grouping mode from either a superscalar mode with a first predetermined number of instructions in the same group or a very long instruction word (VLIW) mode having a second larger number of instructions in the same group, providing a grouping control signal to indicate which grouping mode is selected and using said group control signal to disable a dependency control signal of said first type.

Preferably said pipelines include accesses to a data memory, said pipelines including a first set of pipelines for use in executing instructions needed for memory access operations and a second set of pipelines arranged to carry out arithmetic operations, thereby providing decoupling of memory access operations from arithmetic operations.

Preferably two parallel data manipulation pipelines linked to common cycle timing are provided, each accessing a common set of data registers.

Instructions may be supplied to said parallel data manipulation pipelines together with a dependency control signal of said second type.

Preferably two parallel pipelines linked to common cycle timing are provided for addressing operations used for memory accesses, said two pipelines accessing a common register file for memory access operations.

Instructions may be supplied with a dependency control signal of said first type to either a pair of parallel data manipulation pipelines or a pair of pipelines for addressing operations.

Preferably vertical data dependencies are checked on instructions supplied in successive cycles to each pipeline and resolved by temporary delays in any pipeline where a vertical dependency is detected.

The invention includes a computer system comprising a plurality of parallel execution pipelines, instruction decoding circuitry, and instruction supply circuitry for supplying simultaneously a group of instructions each machine cycle to said pipelines through the decoding circuitry, data dependency checking circuitry arranged to check instructions to determine if any horizontal data dependencies exist between any pair of instructions in a group during execution in a respective pair of parallel pipelines, and signal generating circuitry responsive to said data dependency checking circuitry to generate selectively a dependency control signal or two alternative types, a first type for introducing a delay in one of said pair of pipelines to resolve the horizontal data dependency and a second type to activate a bypass in one of the pair of pipelines to resolve the data dependency.

The computer system may include a data unit having a plurality of parallel execution pipelines accessing a first set of registers for use in executing instructions for arithmetic operations, and an address unit having a plurality of parallel pipelines accessing a second set of registers for use in executing instructions for memory access operations, whereby the execution of instructions for memory accesses are decoupled from execution of instructions for arithmetic operations.

Preferably said dependency control signal of a first type is operable to resolve a data dependency between two instructions entering two pipelines of the data unit simultaneously or to resolve a data dependency between two instructions entering the two address unit pipelines simultaneously.

Preferably said dependency control signal of a second type is operable to resolve a data dependency between two instructions entering simultaneously two pipelines of the data unit.

The computer system may include mode circuitry for indicating one of a plurality of selectable instruction grouping modes, said mode circuitry providing an output to indicate VLIW mode which is operable to disable a dependency control signal of said first type.

Preferably each execution pipeline includes vertical dependency checking circuitry to check for vertical data dependency between instructions entering that pipeline in successive cycles and causing a temporary delay in execution of the pipeline in order to resolve the dependency.

DESCRIPTION OF THE PREFERRED EMBODIMENT

Figure 1:
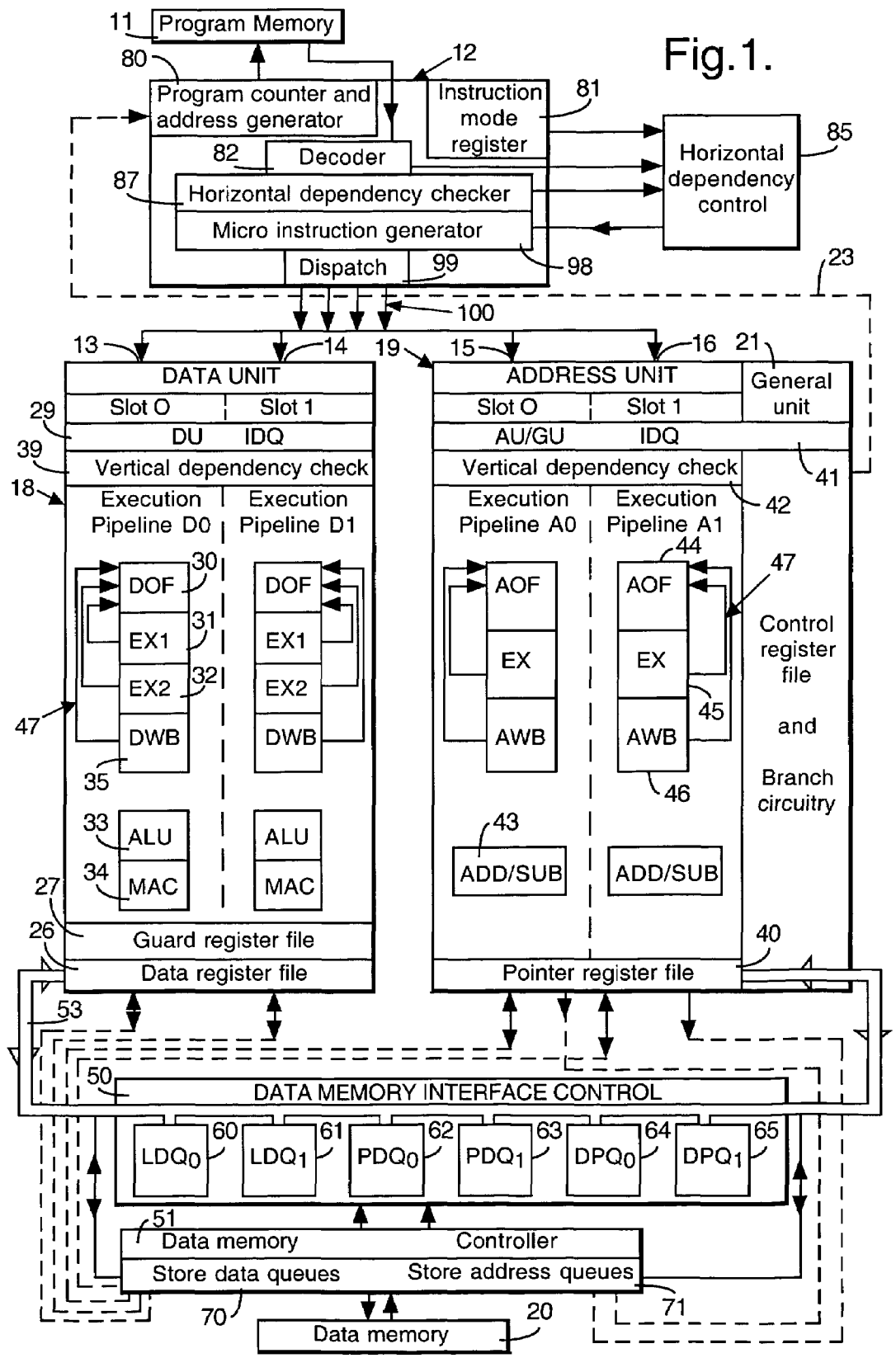
FIG. 1 is a diagram of a computer system in accordance with the present invention.

FIG. 1 is an example of a computer system arranged for the parallel execution of a plurality of instructions, which is particularly suited to providing a high digital signal processing (DSP) performance. Instructions are held in a program memory 11 and after passing through a control unit 12 are supplied to four parallel execution pipelines 13, 14, 15 and 16. Pipelines 13 and 14 are shown as slot 0 and slot 1 of a data unit 18 arranged to execute instructions carrying out arithmetic operations. Pipelines 15 and 16 are shown as slot 0 and slot 1 of an address unit 19 used to execute instructions for memory accesses to a data memory 20. Slot 1 or Slot 0 of the address unit 19 may also be used to supply instructions to a general unit 21 which shares some resources with the address unit 19. The general unit 21 includes a control register file and branch circuitry and is used to provide instruction branch information on line 23 to the control unit 12.

The two pipelines 13 and 14 in the data unit 18 share a common data register file 26 and a common guard register file 27 holding guard values which may be associated with the instructions. Guarded instruction execution has the same meaning as predicated instruction execution. The two pipelines also derive instructions from a common instruction dispatch queue 29 in the data unit 18 and instructions in the queue 29 are checked for data dependency by common dependency check circuitry 39 in the data unit 18. This dependency check refers to data dependency between instructions taken off the queue 29 in successive cycles into the same pipeline and is referred to as a vertical dependency. The sequence of operations in each of the pipeline stages of the data unit 18 is illustrated schematically as a first stage 30 which is a data operand fetch usually accessing one of the register files 26 or 27. Two successive execution stages 31 and 32 may occur in subsequent cycles using for example ALU units 33 or a multiply and accumulate unit 34 which may form part of the pipeline. The second execution stage 32 is followed by a data writeback stage 35 at which the result of an arithmetic operation is returned to the register file 26 or 27. A similar pipeline exists for the two parallel pipelines of the data unit 18.

Similarly for the address unit 19, both pipelines 15 and 16 access a common register file 40 holding pointer values for use in load or store operations in the data memory 20. The two pipelines each take their instructions from a common instruction dispatch queue 41 and a similar vertical dependency check is provided in common for both pipelines 15 and 16 through the address unit 19. The vertical dependency check 42 is similar to that referred to as the vertical dependency check 39 in the data unit. In executing instructions which are taken through the two pipelines 15 and 16, accesses will be made to the register file 40 and add and subtract units 43 may be used by the two pipelines. Each of the pipelines in the address unit has pipeline stages as illustrated. The first stage is an address operand fetch 44 followed by an execution stage 45 and an address write back stage 46. In both the pipelines of the data unit 18 and the address unit 19 bypass circuitry 47 is provided to allow bypassing of some stages of the pipeline.

The machine respects the program alignment as defined by the programmer/software toolchain, i.e., if this latter has placed instructions in the program memory space aligned so as to avoid, for example a slot 0–slot 1 horizontal dependency, then the machine (at the align stage) will always respect the alignment, e.g., in GP32 programming mode program address Obx . . . x0100:R1=R2+R3; (aligned slot 1)

Obx . . . x1000:R0=R1; (aligned slot 0)

Obx . . . x1100:R5=R6; (aligned slot 1)

(Obxx indicates a binary address)

The software has aligned the instructions so that the dependency on R1 does not generate a split (since the instruction R1=R2+R3 is on slot 1 and R0=R1 is on the following slot 0). The aligner is designed so that this alignment is always respected, e.g., if the program branches onto the instruction R1=R2+R3 then the aligner will produce:

|  | slot1 | slot0 |
|---|---|---|
| cycle N: | R1 = R2 + R3 | NOP |
| cycle N + 1: | R5 = R6 | R0 = R1 |

It is important to achieve deterministic behavior that the program alignment in memory is maintained. The Control Unit 12 includes an aligner which controls supply of instructions from a prefetch buffer to the decoder 82. In the alignment stage the aligner ensures that instruction alignment is maintained in the decoder and consequently in the microinstructions that are supplied in the same cycle to each of the execution slots.

Both the data unit 18 and the address unit 19 are connected to the data memory 20 through a data memory interface control 50 and a data memory controller 51. The data memory interface control 50 is connected by a bidirectional bus 53 to both the data unit 18 and address unit 19. The interface control 50 includes a plurality of queues each connected by a bus to the bus 53. These queues include load data queues 60 and 61 for slots 0 and 1 respectively. Queues 62 and 63 hold pointer values to be transferred to data registers for slot 0 and slot 1. Queues 64 and 65 hold data values for transfer to pointer registers for slots 0 and 1.

The data memory controller 51 includes store data queues 70 and store address queues 71.

It will be understood that when instructions are executed to load data from the data memory 20 into the data register files of the data unit 18, the address unit 19 will access the data memory 20 and load the required data into the load data queues 60 or 61 prior to completing the update of the data register file 26 by transferring the data from the appropriate queue 60 or 61. Similarly when instructions are executed to store data from the data unit 18 into the data memory 20 the appropriate data may be held in the store data queues 70 together with the store addresses in queue 71 prior to completing the store operation in the data memory 20.

It will be appreciated that by executing the memory addressing instructions in the address unit 19 in separate parallel pipelines from those provided in the data unit 18, the computer system operates access decoupling in that the memory accesses are effected independently of the arithmetic operations carried out within the data unit 18. This reduces the problem of memory latency. In a digital signal processing system which operates regular and repeated operations, the effective memory latency can be hidden from the executing program.

In the above description, all instructions which are fed through pipelines 13, 14, 15 and 16 are subject to a hardware check on possible vertical dependency. This is carried out in known manner for execution units. If any data dependency is found in the vertical dependency check, the execution unit operates to use a bypass, or if no bypass is available to cause a temporary stall in one of the pair of pipelines 13 or 14 or in the pair 15 and 16 so as to cause a temporary delay in one of the pair of pipelines so as to resolve the data dependency. A delay may be induced by the instruction dispatch queue 29 or 41 providing a signal corresponding to no operand fetch being fed to the first stage 30 or 44 of the execution pipeline for each cycle of delay that is required in order to resolve the data dependency. It will be understood that a check for data dependencies includes any form of data, including data representing guard values.

Figure 5:
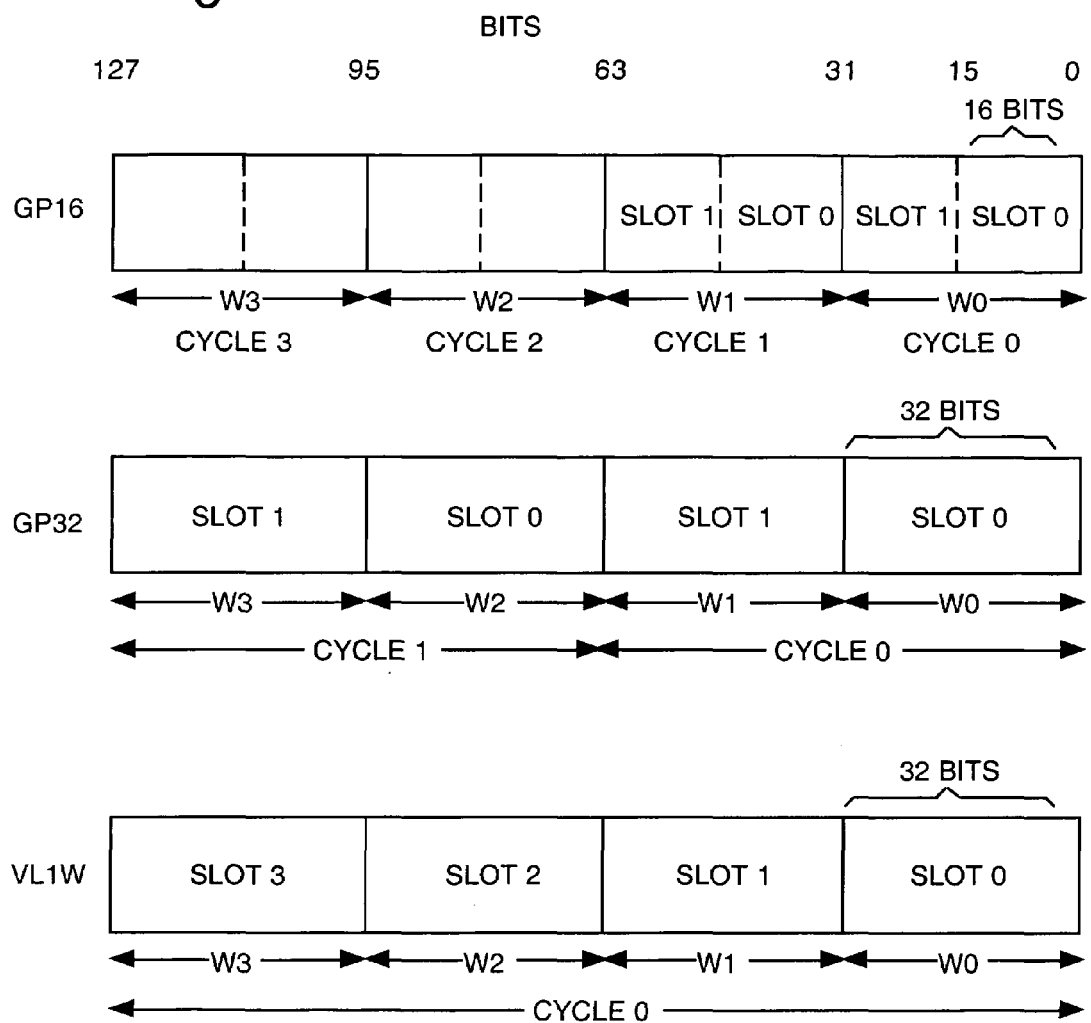
FIG. 5 shows the formats of different instruction modes which may be used in accordance with the system of FIG. 1.

The control unit 12 shown in FIG. 1 is also arranged to provide a horizontal dependency check. In this specification a data dependency between instructions that are supplied to the parallel pipelines in the same machine cycle is referred to as a horizontal dependency. The control unit 12 includes a program counter and address generator 80 to provide a memory address for an instruction fetch operation from the program memory 11. The control unit includes an instruction mode register 81 to indicate the instruction mode in which the machine is operating at any instant. The machine may operate in a selected one of a plurality of modes including superscalar modes of variable instruction bit length or in very long instruction word (VLIW). Examples of the different modes of this example are shown in FIG. 5. According to a first instruction mode, a pair of 16 bit instructions are supplied during each machine cycle to a decoder 82 in the control unit 12. This pair is denoted as slot 0, slot 1 with a bit sequence. W0–W1 etc. Each bit sequence W0, W1 is issued in one machine cycle and this mode is referred to herein as GP16 mode which is a superscalar mode.

According to a second superscalar instruction mode, two instructions each having a length of 32 bits are supplied to the decoder 82 in each machine cycle. In this case both bit sequences W0 and W1 are issued in cycle 0 and bit sequences W2 and W3 are issued in cycle 1. This mode is referred to herein as GP32 mode.

According to a third instruction mode four instructions formed by the bit sequences W0, W1, W2 and W3 each of 32 bits in length. These are supplied in a single cycle as a result of a single fetch operation to the decoder 82. This is referred to herein as a VLIW mode.

In both GP16 and GP32 mode, only two instructions are supplied to the execution pipelines during each cycle. Those two instructions are designated slot 0 and slot 1 and will be supplied either to the data unit or to the address unit or one to each unit. An instruction in slot 0 (slot 1) will always go to AU0 or DU0 (AU1 or DU1 respectively). An instruction (e.g., a load data register) may generate micro-instructions for both the AU and DU e.g., a load DR in slot 1 will generate a micro-instruction for AU1 and DU1. Hardware circuitry in FIG. 1 will check for both vertical and horizontal dependency of instructions supplied to the pipelines in both GP16 and GP32 modes.

As the machine is piplelined, the instruction mode is not necessarily identical everywhere in the pipeline e.g., microinstructions that are being executed in the DU pipelines may originate from GP32 instructions, but the decoder 82 has changed mode and is now in GP16 mode. However, the instruction mode is only important in the decoder 82; micro-instructions are independent of the instruction mode.

GP16 and GP32 modes have different encoding whereas a VLIW instruction is formed of four GP32 instructions and does not have different encoding.

In the case of the VLIW mode vertical dependency checks are carried out by hardware in FIG. 1 but the horizontal data dependency checks are disabled. Instructions which can be grouped together in a single word in VLIW mode are governed by specified rules of instruction compatibility. Although FIG. 5 refers to slots 0–3 for VLIW mode, it will be understood that the four slots in question correspond to the two slots of the data unit and the two slots of the address unit. Consequently the grouping of the instructions within the VLIW word must always include zero, one or two instructions for the address unit and one or two instructions for the data unit. One of the address unit slots of the VLIW mode may include a control instruction for use by the general unit 21.

Figure 2:
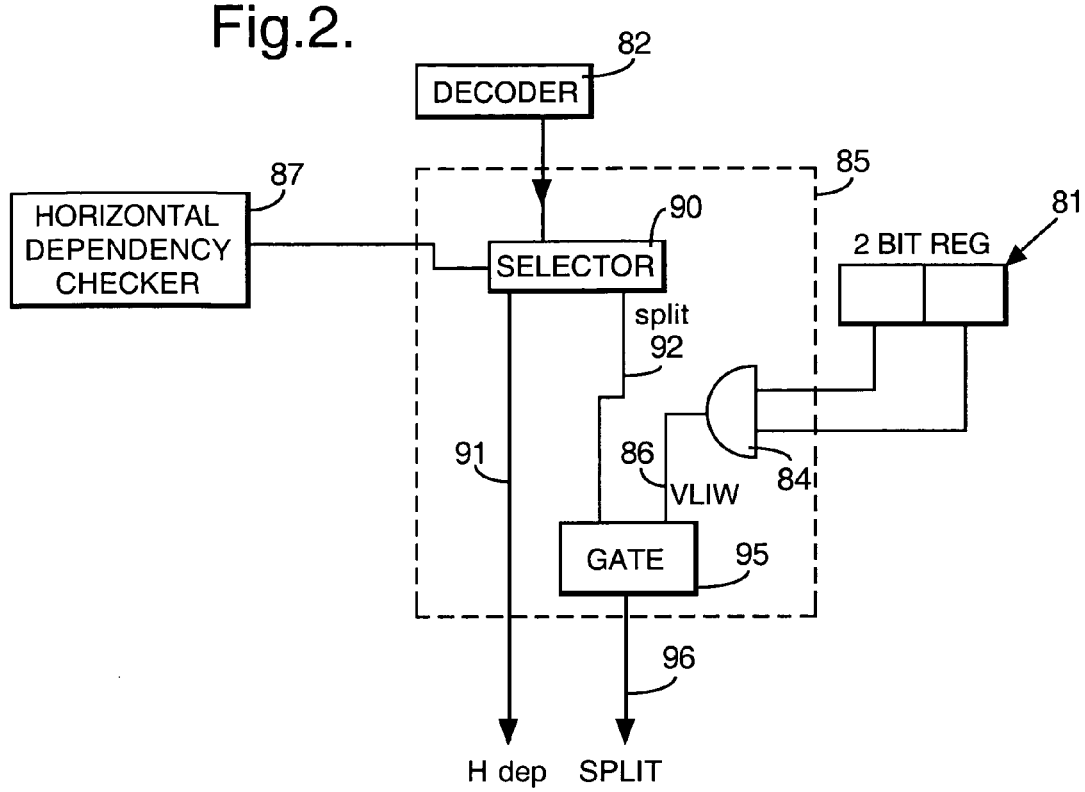
FIG. 2 shows further detail of a horizontal dependency control unit shown in FIG. 1.

The instruction mode register 81 is a two-bit register as shown in FIG. 2. These two bits indicate which of the instruction modes is being used. Both bits are set to 1 in the case of a VLIW instruction. The output of this register 81 is fed to an AND gate 84 in a horizontal dependency control circuit 85. The output of the gate 84 thereby indicates on line 86 whether or not the instruction is in VLIW mode. When the instructions obtained by a single fetch operation in one cycle are decoded by the decoder 82, they are checked for horizontal data dependency by dependency checking circuitry 87. The checker 87 provides an output to the control circuit 85 to indicate if a horizontal data dependency has been located. That output from the checker 87 is fed to a selector circuit 90 which depending on the instructions which have been decoded by the decoder 82 provide either an Hdep signal on line 91 or a split signal on line 92. The split signal 92 indicates that a split in the operation of a pair of parallel execution pipelines is necessary in order to resolve a horizontal dependency. The split line 92 is supplied to a gate circuit 95 which also receives a signal on line 86 indicating whether or not the instruction mode is that of a VLIW instruction. If the instruction is in VLIW mode, the gate 95 disables the split output so that output 96 from the gate 95 is disabled. This only occurs in the event of a VLIW instruction mode. The split may be enabled on line 96 in the event of a horizontal dependency being located with a GP16 or GP32 mode instruction.

Instructions from the decoder 82 are passed to a microinstruction generator 98 which generates a plurality of parallel microinstructions which are output by a dispatch circuit 99 through lines 100 to the four parallel execution pipelines 13, 14, 15 and 16. In the event that the split signal 96 has been enabled, a split bit will be set in the microinstruction passed to the respective execution pipeline so that the data dependency can be resolved. When the two pipelines, for example pipelines 13 and 14 of the data unit, take microinstructions from the instruction dispatch queue 29, the split bit will be detected so that the execution of two instructions where a data dependency occurs will pass through the pipelines with a split in the cycle synchronization during sequential passage of the instructions through the pipelines. The pipeline which requires delay in order to await data from a pipeline stage of another instruction will receive from the instruction dispatch queue 29 signals indicating a no operand fetch for one or more cycles of operation until the delayed instruction execution can proceed without the loss of data being available from the other pipeline at the required stage in its execution. It will therefore be seen that the use of the split signal on line 96 enables a horizontal data dependency check between parallel instructions issued in the same machine cycle to be resolved by a vertical adjustment in the timing of passage through the respective pipelines. In the absence of the split signal, microinstructions entering the two pipelines (slot 0 and slot 1) of either the data unit 18 or address unit 19 are tightly coupled so that they can only enter their respective pipelines simultaneously. The split signal decouples the two slots and allows entry into the slot 0 pipeline at least one cycle before entry is allowed in the slot 1 pipeline.

In the case of a VLIW mode instruction, the split signal 96 is always disabled so that horizontal dependencies between instructions within a single VLIW word must be resolved by software techniques in formation of the acceptable VLIW instruction words.

There are however some horizontal data dependencies which do not require delay of sequential progress through the respective pipelines by means of the split signal 96. If the horizontal dependency arises between arithmetic operations in the data unit and load or store operations in the data unit then bypasses in the pipelines may be set up in order to avoid the need for a temporary stall in operation of the pipelines. If the horizontal dependency checker of 87 provides a signal to the control unit 85 indicating that a horizontal dependency occurs, the selector 90 will respond to the output of the decoder 82. If the decoder indicates that the horizontal dependency problem arises from conflict between an arithmetic operation in the data unit together with either a load or a store in the data unit then the selector 90 will provide an output on line 91 indicating Hdep rather than a split signal on line 92. The signal Hdep on line 91 is only provided in relation to microinstructions supplied to the data unit 18. The microinstruction generator 98 will include an indication in the microinstructions that Hdep from line 91 has been set and this will be supplied to the microinstructions in the instruction dispatch queue of the data unit 18. When a pair of instructions are taken from the queue 29 into the two parallel pipelines of the data unit 18, the indication of Hdep will be responded to by the execution stages of one of the pipelines by activating a bypass circuit to avoid cycles of operation which would otherwise have caused a data dependency problem.

In one example, one pipeline 13 of the data unit 18 may be executing an instruction to load a value into a register in the register file 26 while the other pipeline 14 is attempting to use the value of that data register as an operand in an arithmetic operation. The use of the Hdep signal in the microinstruction will indicate to the arithmetic operation attempting to locate the correct operand that it is not necessary to stall the pipeline as the value it requires as an operand will already be available from a load data queue 60. Consequently the execution of the arithmetic operation in pipeline will seek the correct operand directly from the load data queue 60 as that data is immediately available and there is no need to stall the arithmetic operation until the value has been loaded into the data register file 26 by the instruction being executed in the parallel pipeline 13. Similarly, if one of the pipelines in the data unit is attempting to store data from a particular register while the parallel pipeline is executing an arithmetic operation to generate a new value for the register, it is possible to bypass directly from the second execution stage to the store data queue 70. It is not necessary to stall one of the pipelined operations to allow the data to be written into the data register file 26 before being extracted for addition to a store data queue 70.

The Hdep indication is supplied to the instruction dispatch queue 29 of the data unit 18 as part of the microinstructions. It is however information available for use by the execution units of the data unit and these instructions normally include guard values to determine whether or not the instructions should be executed within the data unit 18. Consequently the bypasses which are indicated as a possibility by inclusion of the Hdep signal will only be activated if the guard values of the instructions confirm that the instructions are to be executed.

It will be seen from the above that data dependencies may arise horizontally between instructions fed to different slots in the data and address units or vertically between pipe stages. These dependencies may arise for read after write operations or write after write operations or write after read operations. An example of a read after write horizontal dependency that is resolved by use of the split indication is as follows:

| Assembly: | R1 = R0; |
| --- | --- |
| | R3 = R2 + R1; |

If these instructions are placed in memory so that R1=R0 appeared in slot 0 and R3=R2+R1 in slot 1 of a common line fetched from memory, then the following dependency arises.

The two illustrated DU micro-instructions have a horizontal RAW dependency on R1: split is therefore set by CU.

| | DU1 | DU0 |
| --- | --- | --- |
| split: | R3 = R2 + R1 | R1 = R0 | split indicates that the DU0 micro-instruction is to be executed at least one cycle before the DU1 micro-instruction.

| cycle N: | NOP | R1 = R0 |
| --- | --- | --- |
| cycle N + 1: | R3 = R2 + R1 | NOP |

An example of a read after write horizontal dependency which can be resolved by use of the Hdep indication is as follows:

| Assembly: | R1 = [P1]; | (That is, register R1 is to be loaded with a value held in a memory location having the address given in pointer register P1) |
|---|---|---|
| | R0 = R1; | |

DU μ-instrs (assuming aligned slot0/1):
RAW horizontal dependency - Hdep set by CU

| DU1 | DU0 |
|---|---|
| R0 = R1 | R1 = [P1] |

Figure 3:
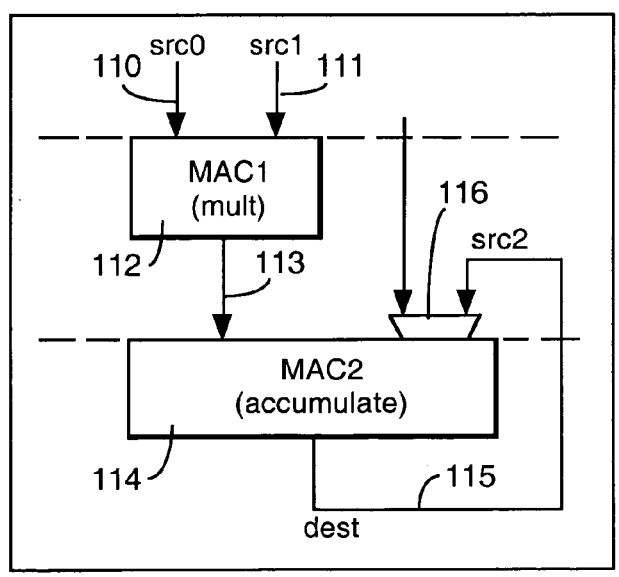
FIG. 3 shows part of a bypass circuit used in the data unit of FIG. 1.

Vertical dependencies which arise between pipe stages of a single pipeline are resolved either by activation of a bypass in the pipeline or by stalling an operand fetch to allow a temporary delay of one or more cycles such that the data dependency is resolved. An example of the bypass in such a vertical dependency is shown in FIG. 3. This example illustrates a repeated multiply and accumulate operation in two MAC pipeline stages. Two source values 110 and 111 are obtained in one cycle of operation and multiplied in unit 112 during a second cycle. The output 113 is supplied to an accumulate operation 114 in cycle 3. The output 115 of the accumulate operation is fed back through a pipeline bypass to be available to MAC 2 in the next cycle. The accumulate operation 114 has immediately available the result of the preceding accumulate operation without needing to go through the write back stage of the pipeline before the accumulated value is available. The output 115 is therefore fed to the multiplexer 116 at the input of the accumulate operation 115 thereby providing the bypass.

Figure 4:
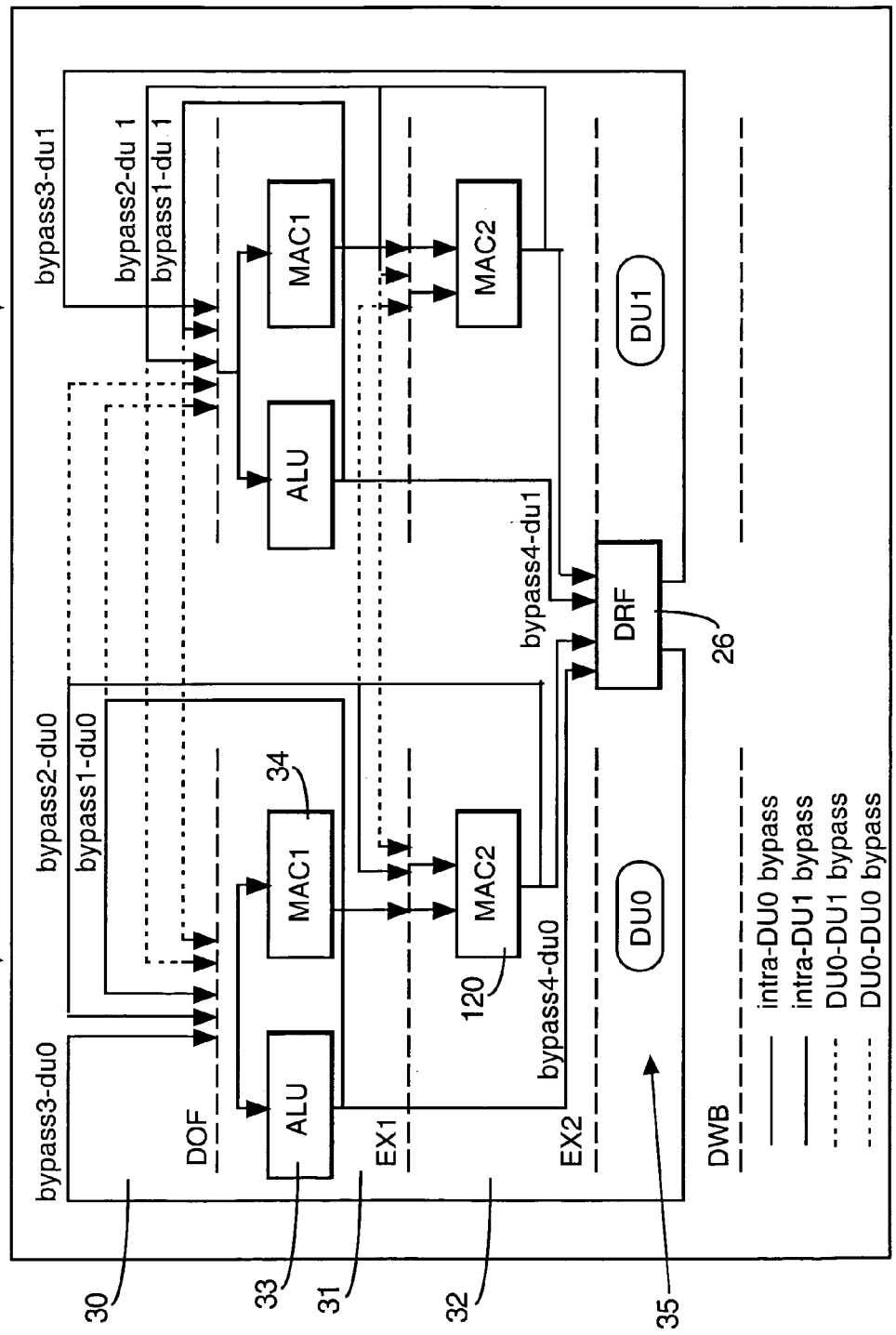
FIG. 4 shows further details of the bypass circuits used in the system of FIG. 1.

FIG. 4 shows in more detail the full bypass circuits available in the particular example of data unit 18 shown in FIG. 1. In this example pipeline 13 is represented as slot 0 or DU0 whereas pipeline 14 is represented as slot 1(DU1). In this case each pipeline is shown with the data operand fetch stage 30 followed by the execution stages 31 and 32 and the final data write back stage 35. The first execution stage 31 includes an Arithmetic and Logic Unit (ALU) 33 and a first multiply and accumulate operation (MAC) 34. The second execution stage includes a second multiply and accumulate operation (MAC) 120. Bypasses which exist between various stages of the same pipeline have been indicated by solid lines whereas bypasses which exist between the two pipelines 13 and 14 are indicated in broken lines. FIG. 4 illustrates that each pipeline has four possible bypasses operative within the various stages of the pipeline. Bypass 1 allows the result of the ALU operation to be used immediately in the operand fetch of the next cycle. Bypass 2 allows the result of a MAC operation (available after two cycles of pipeline operation) to be directly used in the next cycle for an ALU operation (which will have needed to stall for one cycle) or in a next cycle for a new MAC operation without any stall. Bypass 3 uses a property of the register files in that a value written into the data register file during a data write back operation is available in the data operand fetch on the same cycle. Bypass 4 acts as a buffer for one cycle for the output of an ALU operation so that the write back into data register file can be done in the same pipe stage for the output of an ALU operation which required one cycle or a MAC operation which required two cycles. Bypass 4 simplifies synchronization in that all data unit operations have the same latency of 2 cycles even though it is only MAC operations which make use of the second cycle.

The bypasses make DU0 and DU1 totally symmetrical.

It will be seen that the results of different stages of execution may be supplied to an earlier stage of the same pipeline or to an appropriate stage of the parallel pipeline so as to avoid unnecessary stall operations in either of the pipelines.

An example of a vertical dependency resolution requiring two successive instruction cycles in a single pipeline 13 of data unit 18 is given by the following example in which a read after write dependency arises on Register R1:

Assembly: R1 = R2 * R3 + R4//MAC operation (2 cycle)
R6 = R5 + R1; // DU arithmetic using R1
DU μ-instrs (assuming both in slot0):

| | DU0 | DU0 |
|---|---|---|
| DOF | R6 = R5 + R1 RAW vert dep. on R1 that cannot be resolved: STALL instruction R6 = R5 + R1 in DOF; MAC operation (R1 = R2 * R3 + R4) continues execution in pipeline | R6 = R5 + R1 |
| EX1 | R1 = R2 * R3 + R4 | RAW vert dep. that can be resolved - activate bypass |
| EX2 | CYCLE N | R1 = R2 * R3 + R4 CYCLE N + 1 |

Figure 6:
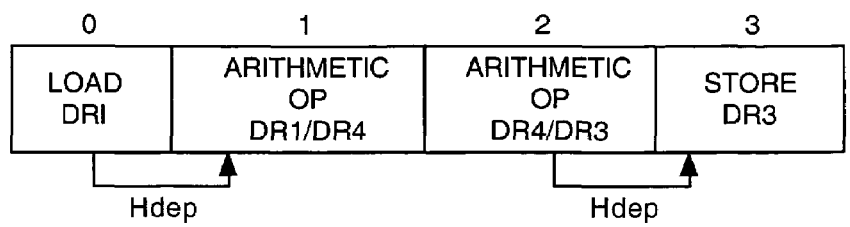
FIG. 6 shows one example of a VLIW instruction word.

In cycle N no bypass is available to avoid the stall in DOF stage of the pipeline but in cycle N+1 bypass 2 of FIG. 4 is operable to avoid a further stall by providing the result of the MAC operation in EX 2 directly to the arithmetic operation in DOF. In the case of VLIW instructions the standard principle is that the result of an operation in a VLIW instruction N is not visible before execution of VLIW instruction N+1. However as explained above, the use of the Hdep signal does allow the formation of VLIW instructions which violate the above principle when two instructions within the same VLIW word require either a load or store operation involving a data unit register as well as a data unit arithmetic operation using the data register. In that case the destination register of a load operation is visible as the source register of an arithmetic operation in the data unit. Similarly the destination register of an arithmetic operation in the data unit is visible as the source register of a store operation in the data unit. Consequently in executing a plurality of instructions which are formed as part of the same VLIW word, some instructions will be executed using old register values from the preceding VLIW word whereas other instructions to which Hdep has been applied will use new values related to other instructions in the same VLIW word. This allows the correct data values to be used while minimising the extent of pipeline stalls. A VLIW instruction of this type is shown in FIG. 6. In this case DR1 is a source register of the DU operation and DR4 is the destination register of the DU operation; in VLIW instr2 DR4 is the source register of the DU operation and DR3 is the destination register of the DU operation. Horizontal dependency between instructions 0 and 1 may cause Hdep resulting in the data unit using the new value of DR1 in executing instruction 1. Hdep will not be set for the pair of instructions 1 and 2 as two arithmetic operations will not cause the decoder 82 of FIG. 2 to set Hdep. Consequently execution of instruction 2 will use the old value of DR4. Hdep will be set for the horizontal dependency of instructions 2 and 3 and consequently execution of instruction 3 will use the new value of DR3.

The invention is not limited to the details of the foregoing example.

In the above example Hdep may be used to resolve a dependency between two instructions entering the data unit, but it may also be used to resolve dependencies between instructions entering the address unit.

The invention claimed is:

1. A method of executing instructions in a computer system which method comprises supplying simultaneously a group of instructions each machine cycle for execution in parallel execution pipelines, decoding each instruction in the group, checking the instructions in the group to determine if any horizontal data dependencies exist between any pair of instructions in the group to be executed in a respective pair of parallel execution pipelines, and in response to determination of such a data dependency selecting a dependency control signal of either a first type if a temporary stall is required in one of the execution pipelines, and of a second type if the data dependency can be resolved by activating a bypass, said method further including generating a plurality of parallel microinstructions from the instructions, said microinstructions including an indication of the selected dependency control signal of the first or second type, supplying the microinstructions to the pair of parallel execution pipelines, and executing the microinstructions in the parallel execution pipelines including effecting a stall or a bypass depending on whether the selected dependency control signal is of the first or second type,
   wherein said execution pipelines include accesses to a data memory, said execution pipelines including a first set of execution pipelines which execute microinstructions needed for memory access operations and a second set of execution pipelines which carry out arithmetic operations, such that memory access operations and arithmetic operations are carried out in different execution pipelines;
   the method further comprising selecting an instruction grouping mode from either a superscalar mode with a first predetermined number of instructions in the same group or a very long instruction word (VLIW) mode having a second larger number of instructions in the same group, providing a grouping control signal to indicate which grouping mode is selected and using said grouping control signal to disable a dependency control signal of said first type.

2. A method according to claim 1 in which two parallel data manipulation pipelines linked to common cycle timing are provided, each accessing a common set of data registers.

3. A method according to claim 2 in which microinstructions are supplied to said parallel data manipulation pipelines including a dependency control signal of said second type.

4. A method according to claim 1 in which two parallel execution pipelines linked to common cycle timing are provided for addressing operations used for memory accesses, said two execution pipelines accessing a common register file for memory access operations.

5. A method according to claim 4 in which microinstructions are supplied including a dependency control signal of said first type to either a pair of parallel data manipulation pipelines or a pair of pipelines for addressing operations.

6. A method according to claim 1 in which vertical data dependencies are checked on microinstructions supplied in successive cycles to each execution pipeline and resolved by temporary delays in any pipeline where a vertical dependency is detected.

7. A method according to claim 6 in which any vertical data dependencies between microinstructions in successive cycles in the same pipeline are resolved by effecting the vertical dependency check within the pipeline and causing at temporary stall in operation of the pipeline when a vertical data dependency is located.

8. A method according to claim 1 in which an instruction dispatch queue is formed in each of the parallel execution pipelines and microinstructions are supplied to the instruction dispatch queue of respective execution pipelines after decoding the instructions.

9. A method according to claim 1 in which the computer system is operated as a digital signal processor and said execution pipelines include effecting repeated multiply and accumulate operations.

10. A computer system comprising a plurality of parallel execution pipelines, instruction decoding circuitry, and instruction supply circuitry for supplying simultaneously a group of instructions each machine cycle to said pipelines through the decoding circuitry, data dependency checking circuitry arranged to check instructions to determine if any horizontal data dependencies exist between any pair of instructions in a group during execution in a respective pair of parallel execution pipelines, and signal generating circuitry responsive to said data dependency checking circuitry to generate selectively a dependency control signal of two alternative types, a first type for introducing a delay in one of said pair of execution pipelines to resolve the horizontal data dependency and a second type to activate a bypass to resolve the data dependency, said computer system further comprising a microinstruction generator for generating a plurality of parallel microinstructions from the instructions, said microinstructions including an indication of the selected dependency control signal of the first or the second type and for supplying the microinstructions to the pair of parallel execution pipelines, said pair of parallel execution pipelines being arranged to execute the microinstructions and operable to effect a stall in response to the selected dependency control signal being of the first type, and to effect a bypass in response to the selected dependency control signal being of the second type,
   wherein the computer system further comprises a data unit having a plurality of parallel execution pipelines accessing a first set of registers for use in executing microinstructions for arithmetic operations, and an address unit having a plurality of parallel execution pipelines accessing a second set of registers for use in executing microinstructions for memory access operations, whereby the execution of microinstructions for memory accesses is carried out in different pipelines to the execution of microinstructions for arithmetic operations,
   the computer system further comprising mode circuitry for indicating one of a plurality of selectable instruction grouping modes, said mode circuitry providing an output to indicate VLIW mode which is operable to disable a dependency control signal of said first type.

11. A computer system according to claim 10 in which said dependency control signal of a first type is operable to resolve a data dependency between two microinstructions entering two pipelines of the data unit simultaneously or to resolve a data dependency between two microinstructions entering the two address unit pipelines simultaneously.

12. A computer system according to claim 10 in which said dependency control signal of a second type is operable to resolve a data dependency between two microinstructions entering simultaneously two pipelines of the data unit.

13. A computer system according to claim 10 in which each execution pipeline includes vertical dependency checking circuitry to check for vertical data dependency between microinstructions entering that pipeline in successive cycles and causing a temporary delay in execution of the pipeline in order to resolve the dependency.

* * * * *

UNITED STATES PATENT AND TRADEMARK OFFICE
CERTIFICATE OF CORRECTION

PATENT NO. : 7,111,152 B1
APPLICATION NO. : 09/563704
DATED : September 19, 2006
INVENTOR(S) : Andrew Cofler et al.

It is certified that error appears in the above-identified patent and that said Letters Patent is hereby corrected as shown below:

Claim 1 should read:
1. A method of executing instructions in a computer system which method comprises supplying simultaneously a group of instructions each machine cycle for execution in parallel execution pipelines, decoding each instruction in the group, checking the instructions in the group to determine if any horizontal data dependencies exist between any pair of instructions in the group to be executed in a respective pair of parallel execution pipelines, and in response to determination of such a data dependency selecting a dependency control signal from among a first type and a second type, the first type being selected if a temporary stall is required in one of the execution pipelines, and the second type being selected if the data dependency can be resolved by activating a bypass said method further including generating a plurality of parallel microinstructions from the instructions, said microinstructions including an indication of the selected dependency control signal of the first or second type, supplying the microinstructions to the pair of parallel execution pipelines, and executing the microinstructions in the parallel execution pipelines including effecting a stall or a bypass depending on whether the selected dependency control signal is of the first or second type,
wherein said execution pipelines include accesses to a data memory, said execution pipelines including a first set of execution pipelines which execute microinstructions needed for memory access operations and a second set of execution pipelines which carry out arithmetic operations, such that memory access operations and arithmetic operations are carried out in different execution pipelines;
the method further comprising selecting an instruction grouping mode from either a superscalar mode with a first predetermined number of instructions in the same group or a very long instruction word (VLIW) mode having a second larger number of instructions in the same group, providing a grouping control signal to indicate which grouping mode is selected and using said grouping control signal to disable a dependency control signal of said first type.

Claim 10 should read:
10. A computer system comprising a plurality of parallel execution pipelines, instruction decoding circuitry, and instruction supply circuitry for supplying simultaneously a group of instructions each machine cycle to said pipelines through the decoding circuitry, data dependency checking circuitry arranged to check instructions to determine if any horizontal data dependencies exist between any pair of instructions in a group during execution in a respective pair of parallel execution pipelines, and signal generating circuitry responsive to said data dependency checking circuitry to generate selectively a dependency control signal of two alternative types, a first type for introducing a delay in one of said pair of execution pipelines to resolve the horizontal data dependency and a second type to activate a bypass to resolve the data dependency,

UNITED STATES PATENT AND TRADEMARK OFFICE
CERTIFICATE OF CORRECTION

PATENT NO. : 7,111,152 B1
APPLICATION NO. : 09/563704
DATED : September 19, 2006
INVENTOR(S) : Andrew Cofler et al.

It is certified that error appears in the above-identified patent and that said Letters Patent is hereby corrected as shown below:

Claim 10 should read (cont'd):
said computer system further comprising a microinstruction generator for generating a plurality of parallel microinstructions from the instructions, said microinstructions including an indication of the selected dependency control signal of the first or the second type and for supplying the microinstructions to the pair of parallel execution pipelines, said pair of parallel execution pipelines being arranged to execute the microinstructions and operable to effect a stall in response to the selected dependency control signal being of the first type, and to effect a bypass in response to the selected dependency control signal being of the second type,
 wherein the computer system further comprises a data unit having a plurality of parallel execution pipelines accessing a first set of registers for use in executing microinstructions for arithmetic operations, and an address unit having a plurality of parallel execution pipelines accessing a second set of registers for use in executing microinstructions for memory access operations, whereby the execution of microinstructions for memory accesses is carried out in different pipelines than the pipelines in which microinstructions for arithmetic operations are executed,
 the computer system further comprising mode circuitry for indicating one of a plurality of selectable instruction grouping modes, said mode circuitry providing an output to indicate VLIW mode which is operable to disable a dependency control signal of said first type.

Signed and Sealed this

Twenty-fourth Day of July, 2007

JON W. DUDAS
*Director of the United States Patent and Trademark Office*